United States Patent Office 3,428,433
Patented Feb. 18, 1969

3,428,433
OXYHYDROGEN COMBUSTION APPARATUS FOR DETERMINING THE SULPHUR AND HALOGEN CONTENTS OF ORGANIC SUBSTANCES
Friedrich Ehrenberger, Loreleistrasse 55, Frankfurt am Main-Unterliederbach, Germany; Siegbert Gorbach, Nelkenweg 8, Kelkheim, Taunus, Germany; and Karl Hommel, Hofheimer Strasse 38a, Lorsbach, Taunus, Germany
Filed June 8, 1965, Ser. No. 462,233
Claims priority, application Germany, June 16, 1964, E 27,228
U.S. Cl. 23—253        6 Claims
Int. Cl. G01n 31/12

ABSTRACT OF THE DISCLOSURE

An oxyhydrogen combustion apparatus for quantitatively determining the contents of sulphur and halogen in organic substances by means of ultimate analyses of reaction gases formed by combustion.

---

Figure 1:
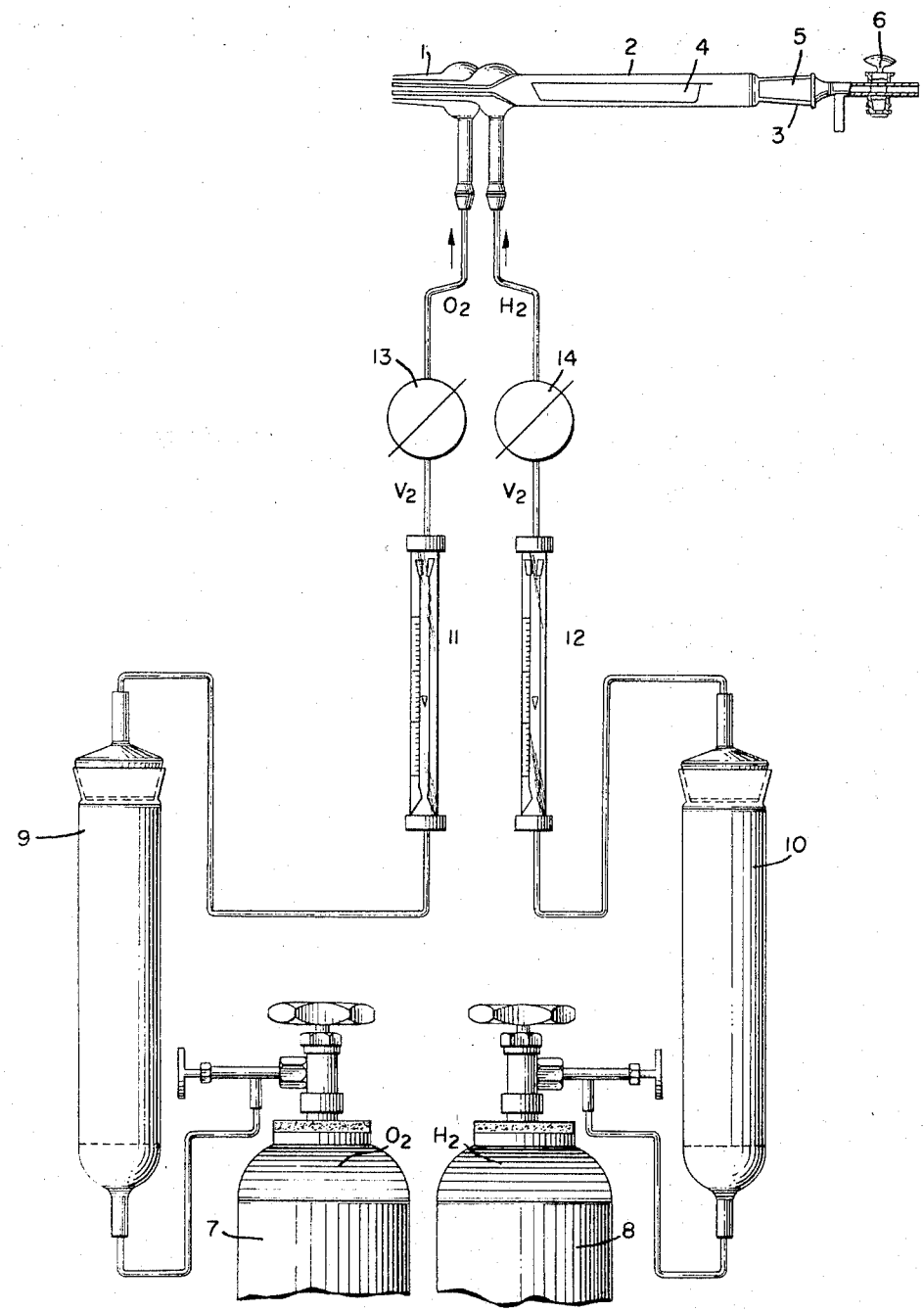

The present invention relates to an oxyhydrogen combustion apparatus for carrying out continuous quantitative determinations of the sulphur and halogen contents of organic substances by means of ultimate analyses.

For determining the content of sulphur and halogen in organic substances, it is necessary to convert the sulphur and halogen which are organically combined with the respective substance into a form which permits them to be clearly determined. This is preferably done by a combustion of the organic substance in an oxyhydrogen flame.

For decomposing organic substances in an oxyhydrogen flame, an apparatus of quartz glass has been developed by R. Wickbold which has been described in the journal, "Angewandte Chemie," in vol. 64 of 1952 on p. 133 and in Vol. 66 of 1954 on p. 173. This oxyhydrogen combustion apparatus according to Wickbold does, however, not permit the absorption solution simply to run off downwardly as long as the oxyhydrogen flame is burning since the combustion gases must be sucked off continuously. This requires the oxyhydrogen flame to be extinguished after each completed combustion. The flame must then be newly ignited and regulated before each further combustion which requires time and a very careful effort. This is especially annoying when longer series of analyses are being carried out since under the pressure of time the necessary dilgence in regulating the flame is then often omitted and the danger of accidents in the operation of such an apparatus is thereby considerably increased. Furthermore, the absorption receiver of this apparatus must be charged and emptied by hand which considerably increases the length of time which is required for each analysis.

It is an object of the present invention to overcome the above-mentioned disadvantages of the oxyhydrogen combustion apparatus according to Wickbold and to improve this type of appaartus in a manner so as to permit it to be operated more easily and safely and also to permit successive analyses to be carried out without interruption.

According to the present invention, this object is attained by providing a receiver which is to be connected to the burner and is flushed automatically by the continuous supply of the absorption solution for the substances which are to be determined and by the reaction water which is formed during the oxyhdrogen reactions. This automatic flushing action permits the analysis specimment to be exchanged in the apparatus without requiring the flame to be extinguished or the flame gases to be deflected from their normal direction.

The oxyhydrogen combustion apparatus according to the invention which is preferably made of quartz glass, quartz ware, or a similar highly silicate material, which we designate as "a highly silicate translucid material," since it is usually transparent to translucent, is designed so as to permit organic substances to be decomposed very quickly and successively by mean of organic ultimate analyses in each of which the respective organic substance is completely vaporized in a burner by being heated from the outside. The vapors of the substance are then conducted into, and burned up in, an oxyhydrogen flame, and the reaction gases which are thereby formed are then conducted into contact with an absorption liquid which absorbs the sulphur and halogen-containing reaction products from these gases. According to the present invention, this apparatus comprises a recipient vessel or receiver which contains the combustion chamber and is adapted to be tightly connected to the oxyhydrogen burner and which, following the combustion chamber, is provided with a part in which the reaction gases which are formed during the combustion are mixed with the absorption liquid which is supplied from an outside source into this part of the receiver. For absorbing the sulphur and halogen-containing reaction gases, this mixture is then drawn by suction through suitable filtering and retarding means, for example, a series of sieve plates or Raschig rings and a fine-pored frit or through several frits or a closely wound spiral in place of the sieve plates. The mixture then flows into a small exchangeable measuring flasks which when filled to a specific level is removed from the apparatus for the purpose of carrying out the further steps of the quantitative determination of the sulphur and halogen contents.

Another very advantageous feature of the invention consists in the fact that the receiver is automatically flushed and cleaned by the continuous flow of the absorption liquid and the reaction water which is formed in the oxyhydrogen flame.

A further important feature of the invention which is of great advantage when carrying out successively an entire series of organic ultimate analyses consists in the fact that the mentioned receiver is designed so that after each combustion it is only necessary to turn a three-way valve in order to eliminate the vacuum in the small measuring flask and to exchange this flask for another without requiring the flame to be either entirely extinguished or deflected from its normal direction.

The features and advantages of the present invention will become more clearly apparent from the following detailed description thereof which is to be read with reference to the accompanying drawings, in which—

Figure 2:
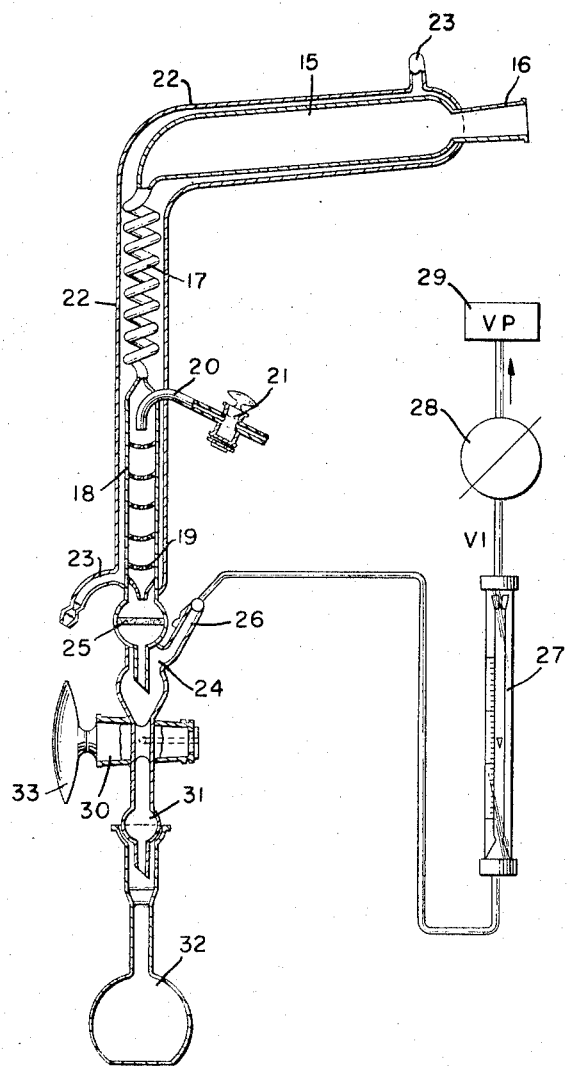

FIGURE 1 shows a diagrammatic illustration of the oxyhydrogen burner, as seen in a side view; while FIGURE 2 shows, partly in section, a side view of the receiver according to the invention.

Referring to the drawings, the oxyhydrogen burner as illustrated in FIGURE 1 comprises a burner head 1 on one end of a tubular part 2 into which, through the inwardly ground other end or mouth 3, a small boat 4 may be inserted which contains the organic substance which is to be analyzed. After such insertion, a ground plug 5 which carries a vent valve 6 is tightly fitted into the mouth 3. The hydrogen and oxygen are supplied to the burner head 1 from their tanks 7 and 8 via the gas purifiers 9 and 10, the flow meters 11 and 12, and the control valves 13 and 14.

FIGURE 2 illustrates the receiver according to the invention which consists of a combustion chamber 15 which has at one end an inwardly ground mouth 16 for connecting it to the burner head 1. The other end of the combustion chamber 15 is connected to a cooling spiral 17 which, in turn, is connected at its lower end to a tubular part 18 which contains a series of sieve plates 19 and above the fisrt of these plates the fused-in end of a tube 20 through which a suitable absorption liquid may be supplied to the receiver part 18 from a source, not shown, via a control valve 21 which permits the flow of this liquid to be regulated. The upper parts of the receiver, that is, the combustion chamber 15, the cooling spiral 17, and the tubular part 18, are surrounded by a cooling jacket 22 through which a coolant may be passed through the inlet and outlet taps 23. The lower end of the tubular part 18 is connected to a wider part 24 which contains a fine-pored frit 25 and carries underneath the latter a socket 26 which is connected via a flow meter 27 and a control valve 28 to a vacuum pump 29, as indicated diagrammatically in FIGURE 2. From the frit 25 the mixture of absorption liquid and reaction gases flows downwardly through a three-way valve 30 to the lower spherical ground end 31 of the receiver upon which the corresponding mouth of a small measuring flask 32 may be fitted which will subsequently be tightly connected thereto by the section which is produced by the evacuation of the receiver. The three-way valve 30 may be provided with a main bore of, for example, 10 mm. through which the liquid will pass from the part 24 of the receiver into the flask 32 when the handle 33 is turned in the direction as shown in the drawing. Valve 30 is further provided with another bore of, for example, 2 mm. through which, when the handle 33 is turned at right angles to the direction as shown, the vacuum in the measuring flask 32 may be released to the outside, while the lower part 24 of the receiver is then shut off tightly so that the vacuum will be maintained therein.

The operation of the apparatus according to the invention is as follows:

At first, the small measuring flask 32 which has a capacity of, for example, 100 ml. is connected to the ground end 31 of the receiver, the handle 33 of the three-way valve 30 is turned to the position as shown, and the receiver is evacuated by the vacuum pump 29. The flame is then ignited on the burner head 1, and the burner head inserted into the mouth 16 of the receiver to which it becomes tightly secured due to the increasing vacuum within the receiver. Valve 21 is then opened so as to start the supply of absorption solution into the tubular part 18 of the receiver. Either at this time or previously, the boat 4 containing the organic substance to be analyzed is inserted into the tubular part 2 of the burner and the ground plug 5 is inserted into the mouth 3 thereof. The substance in the boat 4 is then heated from the outside by means of a strong Bunsen flame so as gradually to be vaporized completely during the subsequent process. The vapors of the substance then pass into the oxyhydrogen flame in which they are burned up. The reaction gases which are formed pass from the combustion chamber 15 through the cooling spiral 17 in which they are cooled, and they are then mixed with the absorption solution in the tubular part 18, whereupon the mixture is drawn through the sieve plates 19 and the frit 25 into the lower receiver part 24. The absorption solution in which the sulphur and halogen-containing reaction gases are then dissolved finally flow through the three-way valve 30 into the measuring flask 32. When the combustion process is completed, valve 21 is turned to stop the further supply of absorption solution, the vent valve 6 is then opened so as to permit the plug 5 and thereafter the empty boat 4 to be withdrawn from the burner. The three-way valve 30 is then turned to its other position so as to release the vacuum in the measuring flask 32, while still maintaining it in the remainder of the apparatus. After the full measuring flask 32 has been exchanged for an empty flask, valve 30 is again turned to the position as shown in FIGURE 2, the boat 4 with a new specimen to be analyzed may be inserted into the burner, and the next combustion process may be started.

Although our invention has been illustrated and described with reference to the preferred embodiment thereof, we wish to have it understood that it is in no way limited to the details of such embodiment but is capable of numerous modifications within the scope of the appended claims.

Having thus fully disclosed our invention, what we claim is:

1. An oxyhydrogen combustion apparatus of highly silicate translucid material for quantitatively determining the contents of sulphur and halogen in organic substances by means of ultimate analyses comprising a burner having a head, and a receiver having a combustion chamber, said burner head adapted to be connected to and disconnected from said combustion chamber, means for supplying oxygen and hydrogen to said head for being ignited as an oxyhydrogen flame, said burner having a tubular part connected to said head and adapted to receive the substance to be analyzed and to be heated from the outside for vaporizing said substance and for conducting the vapors thereof to said head so as to be burned by said flame, said receiver further comprising a tubular member following said combustion chamber for receiving the reaction gases formed by the combustion in said combustion chamber when said burner head is connected thereto, filtering means in said tubular member means for supplying an absorption liquid into said tubular member so as to form a mixure therein with said reaction gases, a connecting member on the lower part of said tubular member adapted to be connected to vacuum-producing means for evacuating said apparatus and for drawing said mixture through said filtering means, said tubular member having a lower end adapted to be connected to a measuring flask for receiving said mixture, said receiver being adapted to be flushed and cleaned automatically by said absorption liquid and the reaction water produced in said flame.

2. An apparatus as defined in claim 1, wherein the highly silicate translucid material is quartz.

3. An apparatus as defined in claim 1, further comprising a cooling jacket surrounding said combustion chamber and at least the upper part of said tubular member and having an inlet and outlet thereon for passing a coolant through said jacket.

4. An apparatus as defined in claim 1, in which said filtering means comprise a plurality of sieve plates and at least one fine-pored frit within said tubular member.

5. An apparatus as defined in claim 1, in which said filtering means comprise a plurality of Raschig rings and at least one fine-pored frit within said tubular member.

6. An apparatus as defined in claim 1, further comprising a three-way valve near the lower end of said tubular member adapted when in one position during the combustion process to connect said receiver with said flask and when said combustion process is completed to be moved to another position in which it connects said flask with the outer atmosphere so as to release the vacuum in said flask and in which it shuts off the parts of said receiver above said valve so as to maintain the vacuum therein.

(References on following page)

References Cited

UNITED STATES PATENTS

| | | |
|---|---|---|
| 2,610,107 | 9/1952 | Dreher. |
| 2,714,833 | 4/1955 | Gilbert. |
| 3,141,741 | 7/1964 | Hoel et al. |
| 3,298,785 | 1/1967 | Reul. |

FOREIGN PATENTS

| | | |
|---|---|---|
| 1,032,000 | 6/1958 | Germany. |

OTHER REFERENCES

D. Hoggan et al., Anal. Chem., 34(8), 1019–1023 (1962).

MORRIS O. WOLK, *Primary Examiner*.

S. MARANTZ, *Assistant Examiner*.

U.S. Cl. X.R.

23—230, 232, 254, 260